Feb. 28, 1956   A. W. ALLEN   2,736,289
APPARATUS FOR APPLYING A PLASTIC
COATING TO THREADS, YARNS, ETC
Filed Nov. 23, 1954
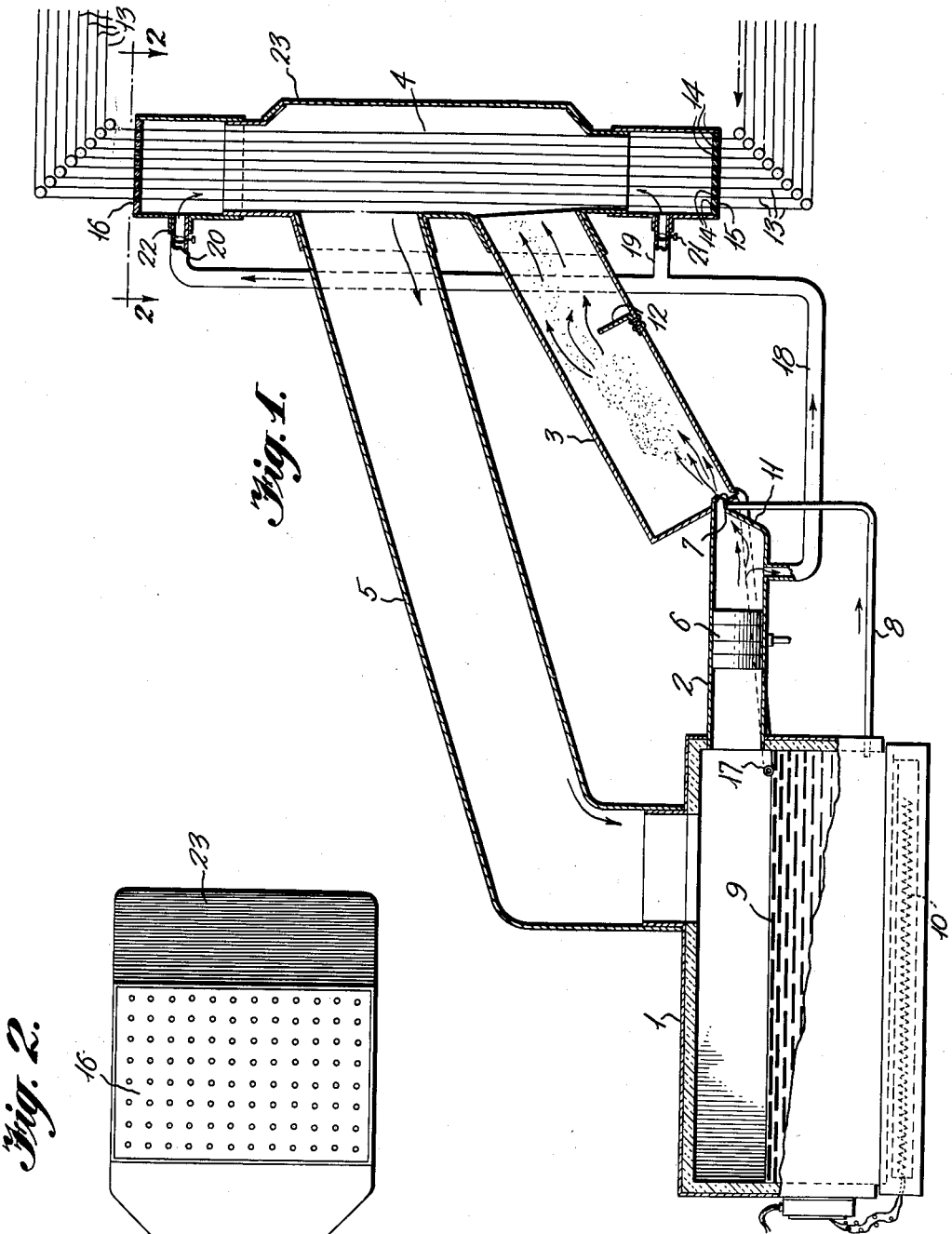
INVENTOR
*Alfred W. Allen*
BY *Mason, Fenwick & Lawrence*
ATTORNEYS

United States Patent Office 2,736,289
Patented Feb. 28, 1956

2,736,289

APPARATUS FOR APPLYING A PLASTIC COATING TO THREADS, YARNS, ETC.

Alfred W. Allen, Greensboro, N. C.

Application November 23, 1954, Serial No. 470,649

6 Claims. (Cl. 118—48)

This invention relates to apparatus for applying a plastic coating to threads, yarns, etc. One of the objects of the invention is to provide a coating chamber, vertically traversed by a plurality of threads, said chamber being a limb of a system for recurrent circulation of atomized liquid coating plastic in a vehicle of its vapor or that of its solvent, whereby the threads passing through said coating chamber become coated or impregnated with said plastic.

A more specific object of the invention is to provide a coating chamber in a recirculation system as described, in which the threads pass through individual perforations in the top and bottom walls of said chamber, the circulation system including a tank containing a volatile liquid plastic mass up to an intermediate level and the vapor from said plastic above said level, including a blower position to draw vapor from said tank and an atomizing nozzle connected to said tank below said liquid level, and being in the path of said blower whereby a mist of atomized plastic is generated at said nozzle, there being a branch conduit out of the vapor line of said recirculation system being divided and connected to said coating chamber at opposite ends, for creating a plenum of vapor at both ends of said coating chamber at a pressure greater than that in the intermediate part of said coating chamber.

Other objects of the invention will appear as the following description of a preferred and practical embodiment proceeds.

In the drawing throughout the Figures of which the same reference characters have been used to designate identical parts:

Figure 1 is a side sectional view of apparatus embodying the principles of the invention;

Figure 2 is a cross-section taken along the line 2—2 of Figure 1.

Referring now in detail to the drawing, the numeral 1 represents a glass lined tank which forms an element in a substantially closed vapor recirculating system, including the conduits 2 and 3, which communicate with the lower part of the coating chamber 4, and a return conduit 5, which extends from the upper part of the coating chamber and communicates with the vapor chamber of the tank. The conduit 2 contains a blower 6, which has its induction end toward the tank. An atomizing nozzle 7 is in the path of air from the eduction side of the blower and is connected to the lower part of the tank by a tube 8. The tank contains a body 9 of liquid plastic, having its surface level below the conduit 2. The liquid is kept at the proper degree of fluidity and volatility by means of an electric heater 10 at the bottom of the tank. The conduit 2, as shown, has its upwardly convergent end wall 11 which concentrates the blast from the blower 6 in the region of the mouth of the nozzle 7. This blast draws liquid from the nozzle 7 into its path, and shatters it into a heavy mist of liquid plastic particles. The lower part of the conduit 2 in which this occurs may therefore be considered an atomizing chamber.

Since it is desired that only the finest mist shall contact the threads, in the avoidance of nonuniform coating or impregnation of the threads, a baffle 12 is placed across the conduit 3 at an intermediate point, against which the larger liquid particles impinge, permitting only the lighter and more uniform mist to rise beyond the baffle and be drawn into the coating chamber by suction in the return conduit 5, induced by the induction of the blower. This fine mist fills the coating chamber 4 and comes in contact with all the threads as they continuously move through the coating chamber in an upward direction. The threads 13 individually pass through apertures 14, formed in the bottom wall 15 and top wall 16 of the coating chamber. The coating chamber is arranged vertically so that no accumulation of the atomized particles upon the walls thereof can drop or trickle into contact with the threads.

Any excess of atomized plastic contacting the walls of the conduit 3 trickles back into the downwardly inclined pipe 17 and discharges into the tank 1.

A branch conduit 18 debouches from the conduit 2 on the pressure side of the blower 6. This conduit divides, the portion 19 communicating with the coating chamber adjacent its lower end, while the portion 20 communicates with said chamber adjacent its upper end. Vapor being carried through the blower, passes through the conduit 18 to both ends of the coating chamber and forms a plenum of higher pressure than that which exists in the intermediate part of the coating chamber, the function of which is to prevent the fouling of the bottom and top walls 15 and 16 of the coating chamber with liquid plastic derived from the mist which fills the intermediate part of the coating chamber. Since it is desired to keep the atmosphere as free as possible from the fumes of the plastic, the plenum pressure should be very slight. For the purpose of regulating it the dampers 21 and 22 are intercalated in the portions 19 and 20 of the conduit 18, adjacent the coating chamber. The return conduit 5 is preferably made more capacious than the conduits 2 and 3, so that there will be comparatively low pressure in the system. This also contributes to the retention of the fumes within the apparatus. The coating chamber may be provided with a removable door 23, through which access may be had to its interior for any purpose such as cleaning or inserting new threads.

While the invention is described in reference to the application of volatile plastic to threads, yarns, etc., it will be understood by those skilled in the art that the invention is not concerned with any particular plastic or coating composition, nor with the thickness of the coat applied to the threads. The speed of passage of the threads through the coating chamber may be determined according to the results desired.

The heating of the plastic facilitates its application to the threads and leaves it in a condition in which it is readily dried by any suitable means upon its emergence from the coating chamber.

While I have in the above description disclosed a simple and practical embodiment of the invention, it will be understood that the specific details of construction and arrangement of parts, as shown, are by way of example and may be modified within the scope of the claims.

What I claim is:

1. Thread coating apparatus comprising the following elements arranged to form a recurrent circulation system for conducting a mist of atomized liquid plastic particles in ambient relation to threads to be coated with said plastic: a tank for containing a body of said plastic up to a predetermined high level thermostatically controlled heating means for said tank for creating an atmosphere of vapor from said plastic above said liquid level, a coating chamber having top and bottom walls with similar patterns of perforations through which moving threads are adapted to pass vertically through said chamber, a mist-supplying conduit establishing communication between said tank above said liquid level and the lower part of said coating chamber, an atomizing nozzle in said conduit connected to said tank below said liquid level, a blower in said conduit between said tank and nozzle for directing a blast of the vapor from said plastic across said nozzle to raise liquid to the mouth of said nozzle and atomize it producing a mist, and a return conduit establishing communication between the upper part of said coating chamber and said tank above said liquid level.

2. Thread coating apparatus comprising the following elements arranged to form a recurrent circulation system for conducting a mist of atomized liquid particles of coating substance in ambient relation to threads to be coated: a tank for containing a body of liquid coating substance up to a predetermined high level, a coating chamber having top and bottom walls with similar patterns of perforations through which moving threads are adapted to pass vertically through said chamber, a mist-supplying conduit establishing communication between said tank above said liquid level and the lower part of said coating chamber, an atomizing nozzle in said conduit connected to said tank below said liquid level, a blower in said conduit between said tank and nozzle for directing a gaseous blast across said nozzle to raise liquid to the mouth of said nozzle and atomize it producing a mist, a return conduit establishing communication between the upper part of said coating chamber and said tank above said liquid level, a branch conduit communicating with said mist-supplying conduit at a point between said blower and nozzle connected to said coating chamber at both ends for producing a plenum of mist-free atmosphere contiguous to the top and bottom walls of said coating chamber, and damper means for regulating the flow through said branch conduit.

3. Thread coating apparatus comprising the following elements arranged to form a recurrent circulation system for conducting a mist of volatile atomized liquid plastic particles of coating substance in ambient relation to threads to be coated: a tank for containing a body of liquid plastic up to a predetermined high level, thermostatically controlled heating means for said tank to produce an atmosphere of the vapor from said plastic above said liquid level, a coating chamber having top and bottom walls through which moving threads are adapted to pass vertically through said chamber, a mist-supplying conduit establishing communication between said tank above said liquid level and the lower part of said coating chamber, said conduit being divided into two sections, an atomizing nozzle in said conduit adjacent the juncture of said sections connected to said tank below said liquid level, a blower in the section adjacent said tank for directing a blast of the vapor from said plastic across said nozzle to raise liquid to the mouth of said nozzle and atomize it producing a mist, a baffle in the other section in the trajectory path of the larger atomized particles, the underneath portion of said other section inclining downwardly below said first mentioned section and having drainage means at its lower end communicating with said tank, and a return conduit establishing communication between the upper part of said coating chamber and said tank above said liquid level.

4. Thread coating apparatus as claimed in claim 3, including a branch conduit communicating with the first mentioned section of said mist-supplying conduit between said blower and nozzle connected to said coating chamber at both ends, and producing a plenum of mist-free atmosphere contiguous to the top and bottom walls of said coating chamber.

5. Thread coating apparatus as claimed in claim 2, said mist-supplying conduit being constricted in the region of said nozzle to increase the velocity flow through said conduit in said region and establish pressure differential between the intermediate part of said coating chamber and the plenums in its end portions.

6. Thread coating apparatus comprising means for establishing a recurrent circulation of the vapor of a volatile coating liquid in ambient relation to threads to be coated, comprising a closed tank for containing a body of said liquid up to a predetermined level providing a vapor space above said level, means forming a coating chamber having top and bottom walls formed with perforations through which moving threads traverse said chamber in substantially vertical direction, lower and upper conduits respectively connecting the lower and upper parts of said coating chamber with said vapor chamber, a blower in said lower conduit having its eduction end toward said coating chamber, said lower conduit being constricted in a zone between said blower and coating chamber, means for enriching the vapor supplied to said coating chamber with an atomized mist of the coating liquid, said means comprising an atomizing nozzle connected to said tank below the liquid level therein and having its mouth opening in said lower conduit in said constricted zone.

References Cited in the file of this patent

UNITED STATES PATENTS

| | | |
|---|---|---|
| 1,263,858 | Cole | Apr. 23, 1918 |
| 2,028,796 | Merritt | Jan. 28, 1936 |
| 2,274,542 | Griffiths | Feb. 24, 1942 |
| 2,458,674 | Blanchard et al. | Jan. 11, 1949 |

FOREIGN PATENTS

| | | |
|---|---|---|
| 670,962 | Great Britain | Apr. 30, 1952 |